United States Patent
Wen

(10) Patent No.: US 11,048,655 B2
(45) Date of Patent: Jun. 29, 2021

(54) NFC PRESSURE TEST METHOD AND SYSTEM BASED ON MOBILE TERMINAL AND STORAGE DEVICE

(71) Applicant: JRD Communication (Shenzhen) LTD., Shenzhen (CN)

(72) Inventor: Xiaolin Wen, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 14 days.

(21) Appl. No.: 16/639,575

(22) PCT Filed: Aug. 14, 2018

(86) PCT No.: PCT/CN2018/100461
§ 371 (c)(1),
(2) Date: Feb. 16, 2020

(87) PCT Pub. No.: WO2019/034054
PCT Pub. Date: Feb. 21, 2019

(65) Prior Publication Data
US 2021/0133135 A1    May 6, 2021

(30) Foreign Application Priority Data
Aug. 16, 2017   (CN) .......................... 201710700853.X

(51) Int. Cl.
*G06F 13/38*   (2006.01)
*H04W 4/80*   (2018.01)
*G06F 13/42*   (2006.01)

(52) U.S. Cl.
CPC ........ *G06F 13/382* (2013.01); *G06F 13/4282* (2013.01); *H04W 4/80* (2018.02); *G06F 2213/0042* (2013.01)

(58) Field of Classification Search
CPC .............. G06F 13/382; G06F 13/4282; G06F 2213/0042; H04W 4/80
See application file for complete search history.

(56) References Cited

U.S. PATENT DOCUMENTS 9,641,961 B2   5/2017   Maeda
9,775,038 B2 *   9/2017   Ko ........................ H04W 12/08
2014/0375421 A1 *   12/2014   Morrison ................ G07C 9/20
340/5.61

(Continued)

FOREIGN PATENT DOCUMENTS

CN   105184337   12/2015
CN   105204849   12/2015

(Continued)

*Primary Examiner* — Henry Tsai
*Assistant Examiner* — John B Roche

(57) ABSTRACT

Provided are a mobile terminal-based NFC stress testing method and system, and a storage device. The method comprises: connecting to a computer to acquire a preset count and a preset frequency; activating an NFC service; determining whether a flag bit is enabled, and if so, detecting an NDEF message, or if not, waiting for the computer terminal to modify the flag bit to be enabled before detecting an NDEF message; and uploading, by a hardware abstraction layer, the NDEF message to an NFC application, disabling a service flag bit, and returning to wait for the computer terminal to modify the flag bit, until detection is complete.

20 Claims, 2 Drawing Sheets

(56) References Cited

U.S. PATENT DOCUMENTS

2015/0222517 A1* 8/2015 McLaughlin ......... H04L 63/126
                                                        713/156
2017/0054770 A1* 2/2017 Wells .................. H04L 65/1006

FOREIGN PATENT DOCUMENTS

| CN | 106375947 | 2/2017 |
|---|---|---|
| CN | 106597127 | 4/2017 |
| CN | 107491706 | 12/2017 |

* cited by examiner

NFC PRESSURE TEST METHOD AND SYSTEM BASED ON MOBILE TERMINAL AND STORAGE DEVICE

RELATED APPLICATIONS

This application is a National Phase of PCT Patent Application No. PCT/CN2018/100461 having International filing date of Aug. 14, 2018, which claims the priority of Chinese Patent Application No. 201710700853.X, filed on Aug. 16, 2017. The contents of the above applications are all incorporated by reference as if fully set forth herein in their entirety.

FIELD AND BACKGROUND OF THE INVENTION

The present disclosure relates to a technology field of NFC pressure tests, and more particularly to an NFC pressure test method and a system based on a mobile terminal and a storage device.

Near file communication (NFC) is a contactless identification and interconnection technology. NFC provides a simple and contactless solution for a user to easily and intuitively exchange information, access content, and services. NFC includes three operating modes. In an active mode, an NFC terminal (such as a mobile phone) serves as a card reader and actively generates a radio frequency field to identify and read/write another NFC device (such as an NFC tag card). In a passive mode, an NFC terminal simulates as a smart card to be read and written, and the NFC terminal is only passively responded to a radio frequency field generated by another device. In a bidirectional mode, two devices (such as two NFC mobile phones) actively generate radio frequency fields to establish a point-to-point communication.

In a pressure test on performance of an NFC mobile phone in the first operating mode, the NFC mobile phone requires to continuously read each type of NFC tag cards (at least four types) dozens of times. In measurement in the prior art, each of the NFC tag cards is held in hand to be moved to be near the mobile terminal. The mobile terminal reads information. Then, steps of taking each of the NFC tag cards away from and near the mobile terminal are repeated cyclically to complete the measurement. The test process is not convenient, and manpower is wasted.

Consequently, the prior art needs to be improved and developed.

SUMMARY OF THE INVENTION

Embodiments of the present disclosure provide an NFC pressure test method and system based on a mobile terminal and a storage device capable of automatically completing an NFC pressure test, increasing convenience, and avoiding manpower wasting.

In a first aspect, an embodiment of the present disclosure provides an NFC pressure test method based on a mobile terminal, including:

connecting a computer terminal to the mobile terminal, acquiring a control permission of an NFC process in the mobile terminal, and presetting a number and a frequency of cyclically controlling an NFC card reading;

initiating an NFC service by the mobile terminal;

determining, by the mobile terminal, whether a service flag bit is enabled;

waiting, by the mobile terminal, for the service flag bit to be modified by the computer terminal to be enabled when the mobile terminal determines that the service flag bit is disabled;

uploading an NDEF message to a hardware abstraction layer after the mobile terminal detects the NDEF message when the mobile terminal determines that the service flag bit is enabled; and uploading the NDEF message to an NFC application by the hardware abstraction layer, modifying, by the mobile terminal, the service flag bit to be disabled, and waiting for the service flag bit to be modified, by the computer terminal, to be enabled until the number and the frequency of tests preset by the computer terminal are completed, wherein the NFC application is configured to record and show each result of the tests.

Further, in the NFC pressure test method based on the mobile terminal, the NDEF message uploaded to the hardware abstraction layer is a message which NFC hardware reads from an NFC test device, and the NFC test device leans against the mobile terminal.

Further, in the NFC pressure test method based on the mobile terminal, the NFC hardware reads the NFC test device to acquire the NDEF message and uploads the NDEF message to the hardware abstraction layer.

Further, in the NFC pressure test method based on the mobile terminal, the NFC hardware includes an NFC antenna, an NFC chip, and NFC firmware.

Further, in the NFC pressure test method based on the mobile terminal, the uploading the NDEF message to the NFC application by the hardware abstraction layer includes:

transmitting the received NDEF message to an NFC service module by the hardware abstraction layer;

establishing an intent message after the NFC service module receives the NDEF message, and transmitting the established intent message to an NFC manager; and transmitting the intent message to the NFC application by the NFC manager.

Further, in the NFC pressure test method based on the mobile terminal, the NFC test device maintain a state of leaning against the mobile terminal before the mobile terminal completes the tests according to the number and the frequency preset by the computer terminal.

Further, in the NFC pressure test method based on the mobile terminal, the NFC test device is an NFC tag card, the NFC pressure test method based on the mobile terminal tests at least four different types of NFC tag cards, and the number preset by the computer terminal is not fewer than 10.

Further, in the NFC pressure test method based on the mobile terminal, the connecting the computer terminal to the mobile terminal specifically includes: connecting the computer terminal to the mobile terminal by a USB interface.

In a second aspect, an embodiment of the present disclosure provides an NFC pressure test system based on a mobile terminal, wherein the system includes:

a computer terminal configured to acquire a control permission of an NFC process in the mobile terminal after being connected to the mobile terminal, preset a number and a frequency of cyclically controlling an NFC card reading, and modify a service flag bit to be enabled; and the mobile terminal connected to the computer terminal and configured to: initiate an NFC service and determine whether the service flag bit is enabled; wherein in a situation that the service flag bit is disabled, the mobile terminal is configured to: wait for the service flag bit to be modified by the computer terminal to be enabled, detect an NFC message until a hardware abstraction layer uploads an NDEF message, upload the NDEF message uploaded by the hardware abstraction layer to an NFC application, and modify the service flat bit to be disabled; or wherein in a situation that the service flag bit is enabled, the mobile terminal is configured to: detect the NFC message until the hardware abstraction layer uploads the NDEF message, upload the NDEF message uploaded by the hardware abstraction layer to the NFC application, and modify the service flat bit to be disabled;

wherein a memory of the mobile terminal stores the NFC application, and the NFC application is configured to receive, record, and show each result of tests transmitted by the mobile terminal.

In a third aspect, an embodiment of the present disclosure provides a storage, wherein the storage device stores computer programs, and the computer programs are executed to perform operations of:

connecting to a computer terminal, acquiring a request for a control permission of an NFC process transmitted by the computer terminal, and presetting a number and a frequency of cyclically controlling an NFC card reading according to different types of NFC tag cards;

initiating an NFC service;

determining whether a service flag bit is enabled;

when it is determined that the service flag bit is disabled, waiting for a message which the computer terminal transmits to modify the service flag bit to be enabled;

when it is determined that the service flag bit is enabled, uploading an NDEF message to a hardware abstraction layer after the NDEF message is detected; and controlling the hardware abstraction layer to upload the NDEF message to an NFC application, modifying the service flag bit to be disabled, and waiting for the message which the computer terminal transmits to modify the service flag bit to be enabled to simulate an action of moving one of the NFC tag cards away, and performing tests according to the number and the frequency preset by the computer terminal, wherein the NFC application is configured to record and show each result of the tests.

Further, in the storage device, the NDEF message uploaded to the hardware abstraction layer is a message which NFC hardware reads from an NFC test device, and the NFC test device leans against the mobile terminal.

Further, in the storage device, the operation of uploading the NDEF message to the hardware abstraction layer after the mobile terminal detects the NDEF message includes:

controlling the NFC hardware to read the NDEF message in the NFC test device, and transmitting NDEF message to the hardware abstraction layer.

Further, in the storage device, the NFC hardware includes an NFC antenna, an NFC chip, and NFC firmware.

Further, in the storage device, the operation of uploading the NDEF message to the NFC application by the hardware abstraction layer includes:

controlling the hardware abstraction layer to transmit the received NDEF message to an NFC service module;

controlling the NFC service module to establish an intent message according to the NDEF message and transmit the established intent message to an NFC manager; and controlling the NPC manager to transmit the intent message to the NFC application.

Further, in the storage device, tag information of all of the NFC tag cards is packaged in the intent message.

Further, in the storage device, before the operation of acquiring the request for the control permission of the NFC process transmitted by the computer terminal and the operation of presetting the number and the frequency of cyclically controlling the NFC card reading according to the different types of the NFC tag cards, the computer programs are executed to further perform:

controlling the NFC test device to maintain a state of leaning against the mobile terminal.

Further, in the storage device, the NFC test device is one of the NFC tag card, the different types of the NFC tag cards include at least four different types, and the number preset by the computer terminal is not fewer than 10.

Further, in the storage device, the operation of connecting to the computer terminal includes:

connecting to the computer terminal by a USB interface.

Further, in the storage device, the operation of determining whether the service flag bit is enabled includes:

determining, when a first time of the tests is performed, whether the service flag bit is enabled.

Further, in the storage device, the operation of determining, when the first time of the tests is performed, whether the service flag bit is enabled includes:

determining, when the first time of the tests is performed on each of the different types of the NFC tag cards, whether the service flag bit is enabled.

Advantageous effect is described as follows. The present disclosure provides an NFC pressure test method and a system based on a mobile terminal and a storage device. The computer terminal is used to be connected to the mobile terminal and acquires the control permission of the NFC process in the mobile terminal. Accordingly, the computer terminal has the permissions of presetting the number and the frequency of cyclically controlling the NFC card reading and modifying the service flag bit to be enabled. In the conventional method, the mobile terminal enables, by holding an NFC tag card in hand to be moved away from the mobile terminal and then to be moved near the mobile terminal, the service flag bit. In the present disclosure, the computer terminal controls and enables the service flag bit according to the preset number and the preset frequency. As such, the NFC pressure test can be automatically completed according to the preset number and the preset frequency after the mobile terminal initiates the NFC service. This increases convenience, and manpower waste can be avoided.

DESCRIPTION OF SPECIFIC EMBODIMENTS OF THE INVENTION

To make the objectives, technical schemes, and technical effect of the present disclosure more clearly and definitely, the present disclosure will be described in details below by using embodiments in conjunction with the appending drawings. It should be understood that the specific embodiments described herein are merely for explaining the present disclosure but not intended to limit the present disclosure.

Figure 1:
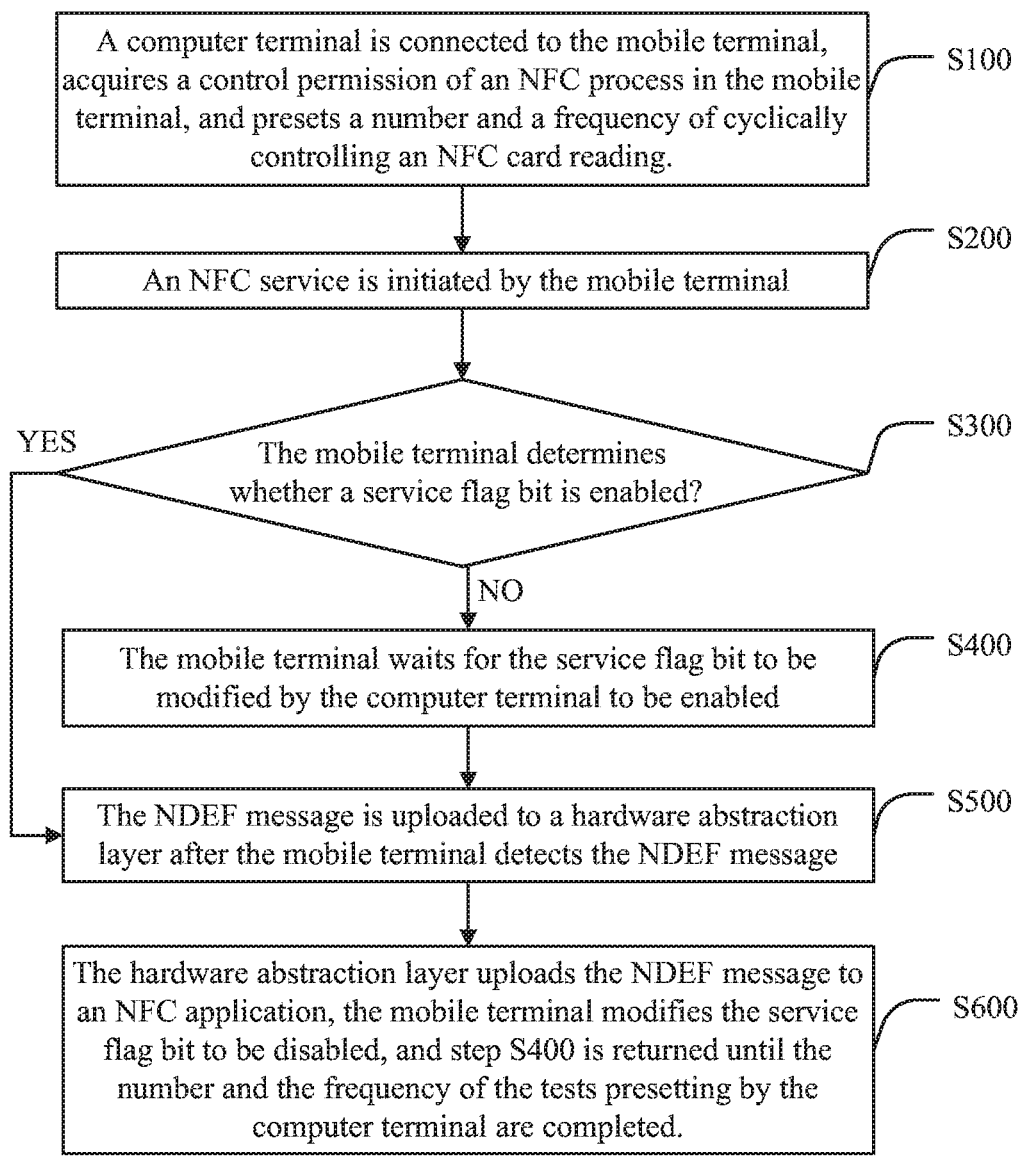
FIG. 1 illustrates a flow chart of an NFC pressure test method based on a mobile terminal provided by an embodiment of the present disclosure.

As shown in FIG. 1, FIG. 1 illustrates a flow chart of an NFC pressure test method based on a mobile terminal in accordance with a preferred embodiment of the present disclosure. The NFC pressure test method based on the mobile terminal includes the following steps.

In step S100, a computer terminal is connected to the mobile terminal, acquires a control permission of an NFC process in the mobile terminal, and presets a number and a frequency of cyclically controlling an NFC card reading.

In the present disclosure, a service of the NFC process is controlled by the computer terminal, and a service flag bit of an NFC test service is modified by a cyclic process. As such, the number and the frequency of transmitting an NDEF message to an upper layer by a low layer can be controlled in a situation that an NFC tag card is not necessary to be moved. An NFC application in the mobile terminal (may be optionally a mobile phone) continuously reads and records an intent message transmitted by an NFC adapter each time. The number of tests is set by control software of the NFC process in the computer terminal. Intent is a runtime binding mechanism which can build connections between two components during the runtime of programs. The programs can express a request or intent to Android by Intent. Android selects a proper component to respond according to content of the intent. Preferably, in the present disclosure, tag information of all of the NFC tag cards is packaged in the intent message. The NFC tag cards refer to NFC tags.

NDEF refers to an NFC Data Exchange Format. NDEF has a simplified and compact binary format and carries various types of data defined by URL, vCard, and NFC.

NDEF can let various NFC functions easily use various support tag types to transmit data. Since detail information of types of NFC tags is packaged in NDEF, the application need not care to communicate with which one of the tags.

Exchange information of NDEF includes a series of records. Each of the records includes a payload. Content of the record may be URL, a MIME medium, or an NFC self-defined data type. When the NFC self-defined data type is used, the content of the payload has to be defined in a record type definition (RTD) document.

The data type and the size of the record are marked by a header of the payload. The header includes a type domain configured to assign a type of the payload, a length of the payload having a unit of octet, and an optional assigned payload configured to indicate whether an NDEF record is carried.

Preferably, the computer terminal is connected to the mobile terminal by a universal serial bus (USB). Certainly, the computer terminal may be connected to the mobile terminal BLUETOOTH or WiFi. However, the USB connection is the most stable connection when compared to other connections. Furthermore, for direct data reading and an operation of writing process, the USB connection is the most proper scheme.

Presetting the number and the frequency of cyclically controlling the NFC card reading is one of permissions acquired by the computer terminal after the computer terminal is connected to the mobile terminal and the programs are written. The specific values of the number and the frequency may be set according to different types of NFC tag cards. The present disclosure is not limited thereto.

In step S200, an NFC service is initiated by the mobile terminal.

The NFC service is implemented according to hardware of the mobile terminal in conjunction with software, and a default setting of the NFC service is initiated after the mobile terminal boots up. The size which the NFC service occupies in a memory is small, and the NFC service does not consume power almost. Accordingly, in a pressure test process, the NFC service is always opened in a preferred embodiment. That is, it is not necessary to close the NFC service and to reopen the NFC service when one of the NFC tag cards completes the tests and another one of the NFC tag cards starts to be tested.

In step S300, the mobile terminal determines whether a service flag bit is enabled. If yes, step S500 is performed. If no, step S400 is performed.

In step S400, the mobile terminal waits for the service flag bit to be modified by the computer terminal to be enabled. Step S500 is performed.

In step S500, the NDEF message is uploaded to a hardware abstraction layer after the mobile terminal detects the NDEF message.

In a preferred embodiment of the present disclosure, the mobile terminal determines, only in a first round of the tests, whether the service flag bit is enabled. That is, the mobile terminal determines, only in a first time of the tests on each of the NFC tag cards, whether the service flag bit is enabled. In the following process, the enabling of the service flag bit is totally controlled by the computer terminal, and thus the mobile terminal does not require to determine whether the service flag bit is enabled. After a determined result is generated by the mobile terminal, the mobile terminal decides, according to the determined result, to directly detect the NFC message or to wait for the service flag bit to be enabled. In other words, the mobile terminal detects the NFC message only when the service flag bit is enabled.

Modifying the service flag bit by the computer terminal is another of the permissions after the computer terminal reads the data of the mobile terminal and writes the programs into the mobile terminal and is a key point that the computer terminal can automatically implement the NFC pressure tests of the mobile terminal. In the NFC pressure test process, switching the service flag bit to be enabled and disabled is a direct implementation that the computer terminal simulates as a user to hold the NFC tag card in hand to be near and away from the mobile terminal.

The NDEF message uploaded to the hardware abstraction layer is acquired by reading, by NFC hardware, an NFC test device leaning against the mobile terminal. The NFC hardware reads the NFC test device to acquire the NDEF message, and the NFC hardware uploads the NDEF message to the hardware abstraction layer after acquiring the NDEF message. The NFC hardware includes an NFC antenna, an NFC chip, and NFC firmware.

In step S600, the hardware abstraction layer uploads the NDEF message to an NFC application, the mobile terminal modifies the service flag bit to be disabled, and step S400 is returned until the number and the frequency of the tests preset by the computer terminal are completed. The NFC application is configured to record and show each result of the tests.

In a preferred embodiment of the present disclosure, the step of uploading the NDEF message to the NFC application by the hardware abstraction layer specifically includes:

transmitting the received NDEF message to an NFC service module by the hardware abstraction layer;

establishing an intent message after the NFC service module receives the NDEF message, and transmitting the established intent message to an NFC manager; and transmitting the intent message to the NFC application by the NFC manager.

In a further preferred embodiment of the present disclosure, the NFC test device leans against the mobile terminal continuously before the mobile terminal completes the tests according to the number and the frequency preset by the computer terminal. Since the pressure test method of the present disclosure is used, it is not necessary to hold the NFC tag card in hand to be moved in a back and forth manner. As a result, the NFC tag card can be positioned on a test platform on a surface of the mobile terminal and lean against the mobile terminal before the NFC tag card completes the tests.

In a complete NFC pressure test process, it is necessary to test at least four different types of NFC tag cards. A number of a test cycle of each of the NFC tag cards reaches dozens of times. Accordingly, the conventional test methods are complicated, and each of mobile terminals having an NFC function requires such a complete test. Manpower is wasted significantly. Effect using the NFC pressure test method provided by the present disclosure can be embodied, and the prior art cannot achieve the effect provided by the technical scheme of the present disclosure.

Technically, a conventional NFC pressure test method usually includes the following steps. First, a mobile terminal initiates an NFC service. Then, the mobile terminal determines whether a service flag bit is enabled. The mobile terminal directly detects an NFC message if yes. The mobile terminal waits for the service flag bit to be enabled if no (the service flag bit is enabled by holding, by a user, an NFC tag card in hand to be away from the mobile terminal). The mobile terminal detects the NFC message again after the service flag bit is enabled. The above-mentioned steps are repeated until an NDEF message is uploaded to a hardware abstraction layer. The hardware abstraction layer uploads the NDEF message to an NFC application. The NFC application records and shows each read result. The complete test process is finished until at least four types of NFC tag cards are cyclically read dozens of times.

In the present disclosure, the computer terminal is connected to the mobile terminal first. Then, the computer terminal acquires the control permission of the NFC process in the mobile terminal, and the computer terminal presets the number and the frequency of cyclically controlling the NFC card reading. The service flag bit is modified, by the computer terminal, to be enabled to simulate an action of moving the NFC tag card away. Finally, the mobile terminal cyclically performs the NFC pressure tests according to the number and the frequency preset by the computer terminal.

Figure 2:
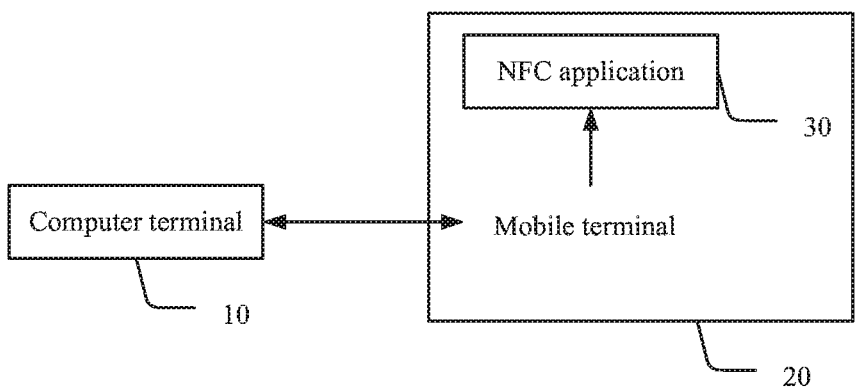
FIG. 2 illustrates an NFC pressure test system based on a mobile terminal provided by an embodiment of the present disclosure.

As shown in FIG. 2, an embodiment of the present disclosure further provides an NFC pressure test system based on a mobile terminal. The NFC pressure test system based on the mobile terminal includes:

a computer terminal 10 configured to acquire a control permission of an NFC process in the mobile terminal after being connected to the mobile terminal, preset a number and a frequency of cyclically controlling an NFC card reading, and modify a service flag bit to be enabled; and the mobile terminal 20 connected to the computer terminal 10 and configured to: initiate an NFC service and determine whether the service flag bit is enabled; wherein in a situation that the service flag bit is disabled, the mobile terminal 20 is configured to: wait for the service flag bit to be modified by the computer terminal 10 to be enabled, detect an NFC message until a hardware abstraction layer uploads an NDEF message, upload the NDEF message uploaded by the hardware abstraction layer to an NFC application 30, and modify the service flat bit to be disabled; or wherein in a situation that the service flag bit is enabled, the mobile terminal 20 is configured to: detect the NFC message until the hardware abstraction layer uploads the NDEF message, upload the NDEF message uploaded by the hardware abstraction layer to the NFC application 30, and modify the service flat bit to be disabled;

wherein a memory of the mobile terminal 20 stores the NFC application 30, and the NFC application 30 is configured to receive, record, and show each result of the tests transmitted by the mobile terminal 20.

It should be noted that those skilled in the art may understand all or some of the processes in the methods of the embodiments described above can be realized by using programs to instruct corresponding hardware. The programs may be stored in a computer readable storage medium. The storage medium may include read-only memory (ROM), random access memory (RAM), disk, compact disc (CD), or the like. The storage medium may be the above-mentioned storage device.

Accordingly, an embodiment of the present disclosure further provides a storage device. The storage device stores computer programs. The computer programs may be loaded and executed by a processor to perform the following operations of:

connecting to a computer terminal, acquiring a request for a control permission of an NFC process transmitted by the computer terminal, and presetting a number and a frequency of cyclically controlling an NFC card reading according to different types of NFC tag cards;

initiating an NFC service;

determining whether a service flag bit is enabled;

when it is determined that the service flag bit is disabled, waiting for a message which the computer terminal transmits to modify the service flag bit to be enabled;

when it is determined that the service flag bit is enabled, uploading an NDEF message to a hardware abstraction layer after the NDEF message is detected; and controlling the hardware abstraction layer to upload the NDEF message to an NFC application, modifying the service flag bit to be disabled, waiting for the message which the computer terminal transmits to modify the service flag bit to be enabled to simulate an action of moving one of the NFC tag cards away, and performing tests according to the number and the frequency preset by the computer terminal, wherein the NFC application is configured to record and show each result of the tests.

The NDEF message uploaded to the hardware abstraction layer is a message which NFC hardware reads from an NFC test device, and the NFC test device leans against the mobile terminal.

The operation of uploading the NDEF message to the hardware abstraction layer after the mobile terminal detects the NDEF message includes:

controlling the NFC hardware to read the NDEF message in the NFC test device, and transmitting the NDEF message to the hardware abstraction layer.

The NFC hardware includes an NFC antenna, an NFC chip, and NFC firmware.

The operation of uploading the NDEF message to the NFC application by the hardware abstraction layer includes:

controlling the hardware abstraction layer to transmit the received NDEF message to an NFC service module;

controlling the NFC service module to establish an intent message according to the NDEF message and transmit the established intent message to an NFC manager; and controlling the NPC manager to transmit the intent message to the NFC application.

Tag information of all of the NFC tag cards is packaged in the intent message.

Before the operation of acquiring the request for the control permission of the NFC process transmitted by the computer terminal and the operation of presetting the number and the frequency of cyclically controlling the NFC card reading according to the different types of the NFC tag cards, the computer programs are loaded and executed by the processor to further perform:

controlling the NFC test device to maintain a state of leaning against the mobile terminal.

The NFC test device is one of the NFC tag cards, the different types of the NFC tag cards include at least four different types, and the number preset by the computer terminal is not fewer than 10.

The operation of connecting to the computer terminal includes:

connecting to the computer terminal by a USB interface.

The operation of determining whether the service flag bit is enabled includes:

determining, when a first time of the tests is performed, whether the service flag bit is enabled.

The operation of determining, when the first time of the tests is performed, whether the service flag bit is enabled includes:

determining, when the first time of the tests is performed on each of the different types of the NFC tag cards, whether the service flag bit is enabled.

Figure 3:
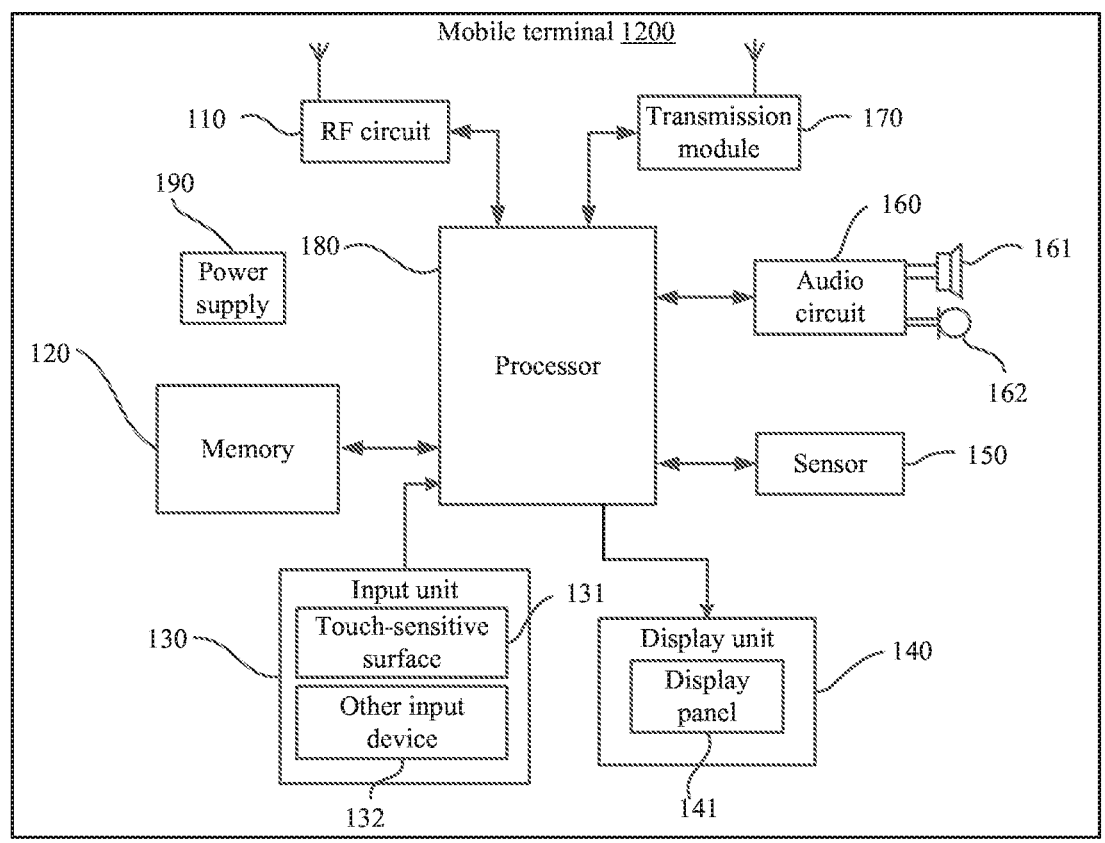
FIG. 3 illustrates a specific structure diagram of a mobile terminal provided by an embodiment of the present disclosure.

FIG. 3 illustrates a structure diagram of a mobile terminal provided by an embodiment of the present disclosure. The mobile terminal may be used to implement the NFC pressure test method based on the mobile terminal provided by the above-mentioned embodiments. The mobile terminal 1200 may be a smart phone or a tablet computer.

As shown in FIG. 3, the mobile terminal 1200 may include a radio frequency (RF) circuit 110, a memory 120 including one or more computer readable storage mediums (only one is shown in FIG. 3), an input unit 130, a display unit 140, at least one sensor 150, an audio circuit 160, a transmission module 170, a processor 180 including one or more processing cores (only one is shown in FIG. 3), a power supply 190 and the like. Those skilled in the art can understand that the mobile terminal 1200 is not limited to the structure shown in FIG. 3, and may include more or fewer parts than those shown in FIG. 3, or some parts may be combined, or different arrangement of parts may be adopted.

The RF circuit 110 is configured to receive and transmit electromagnetic waves and to realize conversions of the electromagnetic waves and electrical signals, thereby communicating with a communication network or any other device. The RF circuit may include various conventional circuit elements used for performing these functions, for example, an antenna, a radio frequency transmitter, a digital signal processor, an encryption/decryption chip, a subscriber identification module (SIM) card, a memory and the like. The RF circuit 110 may communicate with various networks, for example, an Internet, an intranet or a wireless network, or may communicate with any other device via a wireless network. The above-mentioned wireless network may include a cellular telephone network, a wireless local area network or a metropolitan area network. The above-mentioned wireless network may use various communication standards, protocols and technologies and may include but not limited to, Global System of Mobile Communication (GSM), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi, for example, Institute of Electrical and Electronics Engineers (IEEE) 802.11a, IEEE 802.11b, IEEE 802.11g and/or IEEE 802.11n), Voice over Internet Protocol (VoIP) Worldwide Interoperability for Microwave Access (Wi-Max), other protocols for E-mail, instant messaging and Short Messaging Service (SMS) and other suitable communication protocols, and may include protocols which are not developed currently.

The memory 120 may be configured to store software programs and software modules, for example, the program instructions/modules corresponding to the NFC pressure test method based on the mobile terminal in accordance with the above-mentioned embodiments. The processor 180 executes various functional applications and data processing (that is, implements the function of completing the NFC pressure test automatically) by operating the software programs and the software modules stored in the memory 120. The memory 120 may include a high speed random access memory and also may include a non-volatile memory, such as one or more disk storage devices, a flash memory device or other non-volatile solid storage devices. In some embodiments, the memory 120 may further include a remote memory disposed corresponding to the processor 180. The remote memory may be connected to the mobile terminal 1200 via a network. Examples of the network include but are not limited to an internet, an intranet, a local area network, a mobile communication network and the combinations of them.

The input unit 130 may be configured to receive input number or character information and to generate keyboard, mouse, joystick, optical or trajectory ball signal inputs related to a user's setting and functional control. In detail, the input unit 130 may include a touch-sensitive surface 131 and other input device 132. The touch-sensitive surface 131, also called a touch display screen or a touch panel, may be configured to detect touch operations of a user on or near the touch-sensitive surface 131 (for example, operations carried out by the user through any suitable objects or attachments, such as a finger, a touch pen and the like, on the touch-sensitive surface 131 or near the touch-sensitive surface 131) and to drive a corresponding device connected therewith according to a preset program. Optionally, the touch-sensitive surface 131 may include a touch detection device and a touch controller. The touch detection device detects the touch direction of the user, detects a signal caused by the touch operation and transmits the signal to the touch controller. The touch controller receives touch information from the touch detection device, converts the touch information into a contact coordinate and then transmits the contact coordinate to the processor 180 and may receive a command transmitted by the processor 180 and execute the command. Moreover, the touch-sensitive surface 131 may be one of various types, such as a resistance type, a capacitance type, an infrared type, a surface acoustic wave type and the like. Besides the touch-sensitive surface 131, the input unit 130 also may include other input device 132. In detail, other input device 132 may include, but is not limited to, one or more of a physical keyboard, function keys (such as a volume control key, a switching key and the like), a trackball, a mouse, a joystick and the like.

The display unit 140 may be configured to display information input by the user or information provided for the user and various graphical user interfaces of the mobile terminal 1200. The graphical user interfaces may be constituted by graphics, texts, icons, videos and any combinations of them. The display unit 140 may include a display panel 141. Optionally, the display panel 141 may be configured in forms of a Liquid Crystal Display (LCD), an Organic Light-Emitting Diode (OLED) and the like. Furthermore, the touch panel 131 may cover the display panel 141. When the touch-sensitive surface 131 detects a touch operation on or near it, the signal caused by the touch operation is transmitted to the processor 180 to determine the type of a touch event. Then, the processor 180 provides a corresponding visual output on the display panel 141 according to the type of the touch event. In FIG. 3, the touch-sensitive surface and the display panel 141 are served as two independent parts for accomplishing input and output functions, however, in some embodiments, the touch-sensitive surface 131 and the display panel 141 may be integrated to accomplish the input and output functions.

The mobile terminal 1200 may further include at least one sensor 150, such as a gyroscope sensor, a magnetic induction sensor, an optical sensor, a motion sensor and other sensors. In detail, the optical sensor may include an environmental light sensor and a proximity sensor. The environmental light sensor may adjust brightness of the display panel 141 according to the lightness of environmental light. The proximity sensor may turn off the display panel 141 and/or backlight when the mobile terminal 1200 approaches an ear. As one type of the motion sensor, an accelerometer sensor may detect the value of an acceleration in each direction (generally in three axial directions), may detect the value and the direction of gravity in a static state, which may be used in posture identifying functions (such as switching between a horizontal screen and a vertical screen, switching related to a game, and calibration on the posture of a magnetometer), vibration identifying functions (such as for pedometer and striking) and the like. Furthermore, a gyroscope, a barometer, a humidity meter, a thermometer, an infrared sensor and other sensors may be integrated into the mobile terminal 1200, and explanations are not repeated herein.

The audio circuit 160, a speaker 161 and a microphone 162 may provide an audio interface between the user and the mobile terminal 1200. The audio circuit 160 may transmit an electric signal obtained by converting received audio data to the speaker 161. The electric signal is converted into a sound signal to be outputted by the speaker 161. On the other hand, the microphone 162 converts a collected sound signal into an electric signal. The audio circuit 160 receives the electric signal and converts the electric signal into audio data. After the audio data is outputted to the processor 180 and is processed, it is transmitted, for example, to another terminal through the RF circuit 110, or is outputted to the memory 120 in order to be further processed. The audio circuit 160 may further include an ear plug hole for providing communication between an external ear phone and the mobile terminal 1200.

The mobile terminal 1200 can help the user to receive and send E-mails, browse webpages, access streaming media and the like by the transmission module 170 (for example, a Wi-Fi module). The transmission module 170 provides wireless broadband internet access for the user. Although the transmission module 170 is shown in FIG. 3, it should be understood that the transmission module 170 is not the necessary part of the mobile terminal 1200 and may completely be omitted as required without changing the scope of the present disclosure.

The processor 180 is a control center of the mobile terminal 1200, is connected with all the parts of the whole mobile phone by various interfaces and lines and is configured to execute various functions of the mobile terminal 1200 and process the data by operating the software programs and/or the modules stored in the memory 120, and to call the data stored in the memory 120 so as to carry out integral monitoring on the mobile phone. Optionally, the processor 180 may include one or more processing cores. In some embodiments, the processor 180 may be integrated with an application processor and a modulation/demodulation processor. The application processor is mainly configured to process an operating system, at least one user interface, at least one application and the like. The modulation/demodulation processor is mainly configured to process wireless communication. It should be understood that the modulation/demodulation processor may also be not integrated into the processor 180.

The mobile terminal 1200 further includes the power supply 190 (such as a battery) for supplying power to each part. In some embodiments, the power supply may be logically connected with the processor 180 by a power supply management system, so as to implement functions of charge management, discharge management, power consumption management and the like by the power supply management system. The power supply 190 may further include one or more direct current or alternating current power supplies, recharging systems, power supply failure detection circuits, power converters or inverters, power supply status indicators and the like.

Although not shown in the FIG. 3, the mobile terminal 1200 may further include a camera (for example, a front camera or a rear camera), a BLUETOOTH module, and the like which are not further described herein. In the present embodiment, the display unit of the mobile terminal is a touch screen display, and the mobile terminal further includes a memory and one or more programs. The one or more programs are stored in the memory and configured to be executed by one or more processors to perform the following operations contained in the one or more programs:

connecting to a computer terminal, acquiring a request for a control permission of an NFC process transmitted by the computer terminal, and presetting a number and a frequency of cyclically controlling an NFC card reading;

initiating an NFC service;

determining whether a service flag bit is enabled;

when it is determined that the service flag bit is disabled, waiting for a message which the computer terminal transmits to modify the service flag bit to be enabled;

when it is determined that the service flag bit is enabled, uploading an NDEF message to a hardware abstraction layer after the NDEF message is detected; and controlling the hardware abstraction layer to upload the NDEF message to an NFC application, modifying the service flag bit to be disabled, and waiting for a message which the computer terminal transmits to modify the service flag bit to be enabled, and performing tests according to the number and the frequency preset by the computer terminal, wherein the NFC application is configured to record and show each result of the tests.

The NDEF message uploaded to the hardware abstraction layer is a message which NFC hardware reads from an NFC test device, and the NFC test device leans against the mobile terminal.

The operation, performed by the processor 180, of uploading the NDEF message to the hardware abstraction layer after the mobile terminal detects the NDEF message includes:

controlling the NFC hardware to read the NDEF message in the NFC test device, and transmitting the NDEF message to the hardware abstraction layer.

The NFC hardware includes an NFC antenna, an NFC chip, and NFC firmware.

The operation, performed by the process 180, of controlling the hardware abstraction layer to transmit the NDEF message to the NFC application includes:

transmitting the received NDEF message to an NFC service module by the hardware abstraction layer;

establishing an intent message by the NFC service module after the NDEF message is received, and transmitting the established intent message to an NFC manager; and transmitting the intent message to the NFC application by the NPC manager.

The operation, performed by the processor, of connecting to the computer terminal includes: connecting to the computer terminal by a USB interface.

It should be understood that present disclosure is not limited to the exemplary examples. Those skilled in the art in the art may achieve equivalent improvements or replacements according to the above description. The equivalent improvements and replacements should be considered to belong to the protection scope of the present disclosure.

What is claimed is:

1. A Near File Communication (NFC) pressure test method based on a mobile terminal, comprising:

connecting a computer terminal to the mobile terminal, acquiring, by the computer terminal, a control permission of an NFC process in the mobile terminal, and presetting, by the computer terminal, a number and a frequency of cyclically controlling an NFC card reading;

initiating an NFC service by the mobile terminal;

determining, by the mobile terminal, whether a service flag bit is enabled;

waiting, by the mobile terminal, for the service flag bit to be modified by the computer terminal to be enabled when the mobile terminal determines that the service flag bit is disabled;

uploading an NFC Data Exchange Format (NDEF) message to a hardware abstraction layer after the mobile terminal detects the NDEF message when the mobile terminal determines that the service flag bit is enabled;

uploading the NDEF message to an NFC application by the hardware abstraction layer;

modifying, by the mobile terminal, the service flag bit to be disabled; waiting for the service flag bit to be modified, by the computer terminal, to be enabled; and repeating the step of determining, by the mobile terminal, whether the service flag bit is enabled to the step of waiting for the service flag bit to be modified, by the computer terminal, to be enabled until the number and the frequency of tests preset by the computer terminal are completed, wherein the NFC application is configured to record and show each result of the tests.

2. The NFC pressure test method based on the mobile terminal of claim 1, wherein the NDEF message uploaded to the hardware abstraction layer is a message which NFC hardware reads from an NFC test device, and the NFC test device leans against the mobile terminal.

3. The NFC pressure test method based on the mobile terminal of claim 2, wherein the NFC hardware reads the NFC test device to acquire the NDEF message and uploads the NDEF message to the hardware abstraction layer.

4. The NFC pressure test method based on the mobile terminal of claim 3, wherein the NFC hardware comprises an NFC antenna, an NFC chip, and NFC firmware.

5. The NFC pressure test method based on the mobile terminal of claim 4, wherein the uploading the NDEF message to the NFC application by the hardware abstraction layer comprises:

transmitting the received NDEF message to an NFC service module by the hardware abstraction layer;

establishing an intent message after the NFC service module receives the NDEF message, and transmitting the established intent message to an NFC manager; and transmitting the intent message to the NFC application by the NFC manager.

6. The NFC pressure test method based on the mobile terminal of claim 2, wherein the NFC test device maintain a state of leaning against the mobile terminal before the mobile terminal completes the tests according to the number and the frequency preset by the computer terminal.

7. The NFC pressure test method based on the mobile terminal of claim 6, wherein the NFC test device is an NFC tag card, the NFC pressure test method based on the mobile terminal tests at least four different types of NFC tag cards, and the number preset by the computer terminal is not fewer than 10.

8. The NFC pressure test method based on the mobile terminal of claim 1, wherein the connecting the computer terminal to the mobile terminal comprises:

connecting the computer terminal to the mobile terminal by a USB interface.

9. A Near File Communication (NFC) pressure test system based on a mobile terminal, wherein the system comprises:

a computer terminal configured to acquire a control permission of an NFC process in the mobile terminal after being connected to the mobile terminal, preset a number and a frequency of cyclically controlling an NFC card reading, and modify a service flag bit to be enabled; and the mobile terminal connected to the computer terminal and configured to: initiate an NFC service and determine whether the service flag bit is enabled;

wherein in a situation that the service flag bit is disabled, the mobile terminal is configured to: wait for the service flag bit to be modified by the computer terminal to be enabled, detect an NFC message until a hardware abstraction layer uploads an NFC Data Exchange Format (NDEF) message, upload the NDEF message uploaded by the hardware abstraction layer to an NFC application, and modify the service flat bit to be disabled; or wherein in a situation that the service flag bit is enabled, the mobile terminal is configured to: detect the NFC message until the hardware abstraction layer uploads the NDEF message, upload the NDEF message uploaded by the hardware abstraction layer to the NFC application, and modify the service flat bit to be disabled;

wherein a memory of the mobile terminal stores the NFC application, and the NFC application is configured to receive, record, and show each result of tests transmitted by the mobile terminal.

10. A storage device, wherein the storage device is included in a mobile terminal and stores computer programs, and the computer programs are executed to perform operations of:

connecting the mobile terminal to a computer terminal, acquiring a request for a control permission of an NFC process transmitted by the computer terminal, and presetting a number and a frequency of cyclically controlling a Near File Communication (NFC) card reading according to different types of NFC tag cards;

initiating an NFC service;

determining whether a service flag bit is enabled;

when it is determined that the service flag bit is disabled, waiting for a message which the computer terminal transmits to modify the service flag bit to be enabled;

when it is determined that the service flag bit is enabled, uploading an NFC Data Exchange Format (NDEF) message to a hardware abstraction layer after the NDEF message is detected; and controlling the hardware abstraction layer to upload the NDEF message to an NFC application, modifying the service flag bit to be disabled, and waiting for the message which the computer terminal transmits to modify the service flag bit to be enabled to simulate an action of moving one of the NFC tag cards away, and performing tests according to the number and the frequency preset by the computer terminal, wherein the NFC application is configured to record and show each result of the tests.

11. The storage device of claim 10, wherein the NDEF message uploaded to the hardware abstraction layer is a message which NFC hardware reads from an NFC test device, and the NFC test device leans against the mobile terminal.

12. The storage device of claim 11, wherein the operation of uploading the NDEF message to the hardware abstraction layer after the mobile terminal detects the NDEF message comprises:

controlling the NFC hardware to read the NDEF message in the NFC test device, and transmitting NDEF message to the hardware abstraction layer.

13. The storage device of claim 12, wherein the NFC hardware comprises an NFC antenna, an NFC chip, and NFC firmware.

14. The storage device of claim 13, wherein the operation of uploading the NDEF message to the NFC application by the hardware abstraction layer comprises:

controlling the hardware abstraction layer to transmit the received NDEF message to an NFC service module;

controlling the NFC service module to establish an intent message according to the NDEF message and transmit the established intent message to an NFC manager; and controlling the NPC manager to transmit the intent message to the NFC application.

15. The storage device of claim 13, wherein tag information of all of the NFC tag cards is packaged in the intent message.

16. The storage device of claim 11, wherein before the operation of acquiring the request for the control permission of the NFC process transmitted by the computer terminal and the operation of presetting the number and the frequency of cyclically controlling the NFC card reading according to the different types of the NFC tag cards, the computer programs are executed to further perform:

controlling the NFC test device to maintain a state of leaning against the mobile terminal.

17. The storage device of claim 16, wherein the NFC test device is one of the NFC tag card, the different types of the NFC tag cards include at least four different types, and the number preset by the computer terminal is not fewer than 10.

18. The storage device of claim 10, wherein the operation of connecting the mobile terminal to the computer terminal comprises:

connecting the mobile terminal to the computer terminal by a USB interface.

19. The storage device of claim 10, wherein the operation of determining whether the service flag bit is enabled comprises:

determining, when a first time of the tests is performed, whether the service flag bit is enabled.

20. The storage device of claim 19, wherein the operation of determining, when the first time of the tests is performed, whether the service flag bit is enabled comprises:

determining, when the first time of the tests is performed on each of the different types of the NFC tag cards, whether the service flag bit is enabled.

* * * * *